(12) United States Patent
Ferrari et al.

(10) Patent No.: US 11,730,071 B2
(45) Date of Patent: *Aug. 22, 2023

(54) SYSTEM AND METHOD FOR AUTOMATICALLY ESTIMATING AND ADJUSTING CROP RESIDUE PARAMETERS AS A TILLAGE OPERATION IS BEING PERFORMED

(71) Applicant: CNH Industrial America LLC, New Holland, PA (US)

(72) Inventors: Luca Ferrari, Modena (IT); John H. Posselius, Ephrata, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/586,194

(22) Filed: Jan. 27, 2022

(65) Prior Publication Data

US 2022/0142033 A1 May 12, 2022

Related U.S. Application Data

(63) Continuation of application No. 15/413,721, filed on Jan. 24, 2017, now Pat. No. 11,266,054.

(51) Int. Cl.
*A01B 79/00* (2006.01)
*A01B 49/02* (2006.01)
(Continued)

(52) U.S. Cl.
CPC ............ *A01B 49/027* (2013.01); *A01B 76/00* (2013.01); *A01B 79/00* (2013.01); *G06T 7/001* (2013.01);
(Continued)

(58) Field of Classification Search
CPC .... A01G 22/00; A01C 21/002; A01M 21/043; A01M 21/04; Y02A 40/12; A01B 49/027;
(Continued)

(56) References Cited

U.S. PATENT DOCUMENTS

| | | | |
|---|---|---|---|
| 4,935,700 | A | 6/1990 | Garbini et al. |
| 5,044,756 | A | 9/1991 | Gaultney et al. |

(Continued)

FOREIGN PATENT DOCUMENTS

| | | |
|---|---|---|
| CN | 1447116 | 10/2003 |
| WO | WO2009/153304 | 12/2009 |

(Continued)

OTHER PUBLICATIONS

Elbert C. Dickey, David P. Shelton, G.E. Meyer and K.T. Fairbanks "Determining Crop Residue Cover with Electronic Image Analysis" Dated Jan. 1, 1989, (10 pages).

(Continued)

*Primary Examiner* — Christian Chace
*Assistant Examiner* — Jordan S Fei
(74) *Attorney, Agent, or Firm* — Rebecca Henkel; Rickard Demille (57) ABSTRACT

A method for estimating and adjusting crop residue parameters may include controlling an operation of a tillage implement as the implement is being towed by a work vehicle across the field to perform a tillage operation and receiving a pre-tilled image of an imaged portion of the field located to one side of a first section of the field as the implement is being towed across the first section of the field. The method may also include receiving a post-tilled image of the imaged portion of the field as the implement is being towed across the field, analyzing the pre-tilled and post-tilled images of the imaged portion of the field to estimate a crop residue parameter for the field, and, when the esti- (Continued)

mated parameter differs from a target associated with such parameter, actively adjusting the operation of the tillage implement in a manner designed to adjust the crop residue parameter.

20 Claims, 5 Drawing Sheets

(51) Int. Cl.
    *A01B 76/00*     (2006.01)
    *H04N 7/18*     (2006.01)
    *G06T 7/00*     (2017.01)

(52) U.S. Cl.
    CPC ... *H04N 7/181* (2013.01); *G06T 2207/30188* (2013.01)

(58) Field of Classification Search
    CPC ......... A01B 76/00; A01B 79/00; G06T 7/001; G06T 2207/30188; H04N 7/181
    See application file for complete search history.

(56) References Cited

U.S. PATENT DOCUMENTS

| | | | |
|---|---|---|---|
| 5,278,423 | A | 1/1994 | Wangler et al. |
| 5,412,219 | A | 5/1995 | Chappelle et al. |
| 6,222,628 | B1 | 4/2001 | Corallo et al. |
| 6,608,672 | B1 | 8/2003 | Shibusawa et al. |
| 6,853,937 | B2 | 2/2005 | Shibusawa et al. |
| 6,919,959 | B2 | 7/2005 | Masten |
| 7,068,816 | B1 | 6/2006 | Knoblauch et al. |
| 7,092,106 | B2 | 8/2006 | Cox et al. |
| 7,748,264 | B2 | 7/2010 | Prem |
| 8,179,533 | B2 | 5/2012 | Alemeh |
| 8,451,449 | B2 | 5/2013 | Holland |
| 8,463,510 | B2 | 6/2013 | Knapp |
| 8,755,049 | B2 | 6/2014 | Holland |
| 8,862,339 | B2 | 10/2014 | Henry et al. |
| 8,958,603 | B2 | 2/2015 | Boriah et al. |
| 9,026,321 | B2 | 5/2015 | Henry et al. |
| 9,030,549 | B2 | 5/2015 | Redden |
| 9,050,725 | B2 | 6/2015 | Shull |
| 9,058,560 | B2 | 6/2015 | Johnson |
| 9,107,344 | B2 | 8/2015 | Madsen et al. |
| 9,131,642 | B2 | 9/2015 | Groeneveld |
| 9,147,110 | B2 | 9/2015 | Anderson et al. |
| 9,148,995 | B2 | 10/2015 | Hrnicek et al. |
| 9,282,688 | B2 | 3/2016 | Casper et al. |
| 9,428,885 | B2 | 8/2016 | Nau |
| 2002/0090132 | A1 | 7/2002 | Boncyk et al. |
| 2007/0039745 | A1 | 2/2007 | Anderson et al. |
| 2014/0347448 | A1 | 11/2014 | Hegemann et al. |
| 2015/0268218 | A1 | 9/2015 | Troxler |
| 2015/0305228 | A1 | 10/2015 | Zemenchik |
| 2015/0354943 | A1 | 12/2015 | Posselius et al. |
| 2016/0029547 | A1 | 2/2016 | Casper et al. |
| 2016/0084813 | A1 | 3/2016 | Anderson et al. |
| 2016/0134844 | A1 | 5/2016 | Casper et al. |
| 2017/0112043 | A1 | 4/2017 | Nair et al. |
| 2018/0027179 | A1 | 1/2018 | Matsuzaki et al. |
| 2018/0206393 | A1 | 7/2018 | Stoller et al. |
| 2019/0073534 | A1 | 3/2019 | Dvir et al. |

FOREIGN PATENT DOCUMENTS

| | | |
|---|---|---|
| WO | WO2012/029026 | 3/2012 |
| WO | WO2016/025848 | 2/2016 |
| WO | WO2016/110832 | 7/2016 |
| WO | WO2017/049186 | 3/2017 |

OTHER PUBLICATIONS

Thuy Le Toan, F. Mattia, G. Satalino, T. Manninen and M. Borgeaud "On the Characterization of Agricultural Soil Roughness for Radar Remote Sensing Studies" Browaw Journals & Magazines Published Aug. 6, 2002, (3 Pages).
C.S.T. Daughtry, J.E. McMurtrey III, M.S. Kim and E.W. Chappelle "Estimating Crop Residue Cover by Blue Fluorescence Imaging" Dated 1997, (8 pages).
M.M. Rahman, M.S. Moran, D.P. Thoma, R. Bryant, C.D. Holifield Collins, T. Jackson, B.J. Orr and M. Tischler "Mapping Surface Roughness and Soil Moisture Using Multi-Angle Radar Imagery Without Ancillary Data" Science Direct / Remote Sensing of Environment Published 2008, (12 Pages).
W. Skterucha, A.M. Wilczek and R.T. Walczak "Application of Smart Sensors in the Measurement of Soil Physical Parameters".
Institute of Agrophysics, Polish Academy of Sciences, Lublin, Poland Published 2004, (7 Pages).
L.M. Thomsen, J.E.M. Baartman, R.J. Barneveld, T. Starkloff and J. Stolte "Soil Surface Roughness: Comparing Old and New Measuring Methods and Application in a Soil Erosion Model" Soil Physics and Land Management Group, Wageningen University, Wageningen, the Netherlands and Norwegian Institute of Agriculture and Environmental Research, Bioforsk, As, Norway Published Apr. 24, 2015, (12 Pages).
Ted M. Zobek "Soil Surface Roughness Measurement" USDA, Agricultural Research Service, Lubbock, TX. Published 1990. (3 Pages).

SYSTEM AND METHOD FOR AUTOMATICALLY ESTIMATING AND ADJUSTING CROP RESIDUE PARAMETERS AS A TILLAGE OPERATION IS BEING PERFORMED

CROSS-REFERENCE TO RELATED APPLICATION

This application is a continuation of and claims the benefit of priority of U.S. patent application Ser. No. 15/413,721, filed on Jan. 24, 2017, the disclosure of which is hereby incorporated by reference herein in its entirety for all purposes.

FIELD OF THE INVENTION

The present subject matter relates generally to systems and methods for automatically estimating and adjusting crop residue parameters as a tillage operation is being performed and, more particularly, to a system and method for automatically estimating the percent crop residue coverage remaining on a field during the performance of a tillage operation and for actively adjusting the operation of an associated tillage implement when the estimated percent crop residue coverage differs from a target percentage set for the field.

BACKGROUND OF THE INVENTION

Crop residue generally refers to the vegetation (e.g., straw, chaff, husks, cobs) remaining on the soil surface following the performance of a given agricultural operation, such as a harvesting operation or a tillage operation. For various reasons, it is important to maintain a given amount of crop residue within a field following an agricultural operation. Specifically, crop residue remaining within the field can help in maintaining the content of organic matter within the soil and can also serve to protect the soil from wind and water erosion. However, in some cases, leaving an excessive amount of crop residue within a field can have a negative effect on the soil's productivity potential, such as by slowing down the warming of the soil at planting time and/or by slowing down seed germination. As such, the ability to monitor and/or adjust the amount of crop residue remaining within a field can be very important to maintaining a healthy, productive field, particularly when it comes to performing tillage operations. Unfortunately, current tillage-related systems and methods are not equipped to accurately and efficiently monitor and adjust the amount of crop residue remaining within a field during a tillage operation.

For example, U.S. Pat. No. 9,282,688, titled "Residue Monitoring and Residue-Based Control" (Casper et al.), discloses a residue monitoring system that utilizes cameras mounted on a tillage implement to capture images of the field immediately forward of the tillage implement (i.e., between the implement and the tractor) and immediately behind the tillage implement. The system controller is then configured to analyze the forward and aft images to determine an indicator of the residue coverage. However, the system proposed in U.S. Pat. No. 9,282,688 suffers from various drawbacks or disadvantages, particularly with reference to the use of computer-aided image processing techniques to analyze the forward and aft images. Specifically, given the placement of the cameras at the forward and aft ends of the tillage implement and the associated field of view of each camera, the images captured are typically going to contain significant amounts of dust and other air-borne particles kicked up by the tractor and/or the implement as the tillage operation is being performed. As such, given the significant amount of dust and other air-borne particles contained within the images, it becomes very difficult to develop and/or implement suitable computer-aided image processing techniques that can effectively, efficiently, and accurately detect the amount of crop residue remaining within the field.

Accordingly, an improved system and method for estimating and adjusting crop residue parameters as a tillage operation is being performed that overcomes one or more of the issues in the prior art would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for estimating and adjusting crop residue parameters as a tillage operation is being performed within a field. The method may include controlling, with a computing device, an operation of a tillage implement as the tillage implement is being towed by a work vehicle across the field to perform the tillage operation and receiving, with the computing device, a pre-tilled image of an imaged portion of the field located to one side of a first section of the field as the tillage implement is being towed across the first section of the field. The pre-tilled image may be associated with an initial side view image of the imaged portion of the field from one of the work vehicle or the tillage implement prior to the tillage operation being performed thereon. The method may also include receiving, with the computing device, a post-tilled image of the imaged portion of the field as the tillage implement is being towed by the work vehicle across the field. The post-tilled image may be associated with a subsequent side view image of the imaged portion of the field after the tillage operation has been performed thereon. In addition, the method may include analyzing, with the computing device, the pre-tilled and post-tilled images of the imaged portion of the field to estimate a crop residue parameter for the field and, when the estimated crop residue parameter differs from a target associated with the crop residue parameter, actively adjusting, with the computing device, the operation of the tillage implement in a manner designed to adjust the crop residue parameter.

In another aspect, the present subject matter is directed to a system for estimating and adjusting crop residue parameters as a tillage operation is being performed within a field via a tillage implement towed by a work vehicle. The system may include an imaging device installed relative to one of the work vehicle or the tillage implement such that the imaging device is configured to capture images of the field as the tillage operation is being performed. In addition, the system may include a controller commutatively coupled to the imaging device. The controller may include a processor and associated memory. The memory may store instructions that, when implemented by the processor, configure the controller to receive, from the imaging device, a pre-tilled image of an imaged portion of the field located to one side of a first section of the field as the tillage implement is being towed by the work vehicle across the first section of the field. The pre-tilled image may be associated with an initial side view image of the imaged portion of the field from the one of the work vehicle or the tillage implement prior to the tillage operation being performed thereon. The controller may also be configured to receive, from the imaging device, a post-tilled image of the imaged portion of the field as the tillage implement is being towed by the work vehicle along the field. The post-tilled image may be associated with a subsequent side view image of the imaged portion of the field after the tillage operation has been performed thereon. Moreover, the controller may be configured to analyze the pre-tilled and post-tilled images of the imaged portion of the field to estimate a crop residue parameter for the field and, when the estimated crop residue parameter differs from a target associated with the crop residue parameter, actively adjust the operation of the tillage implement in a manner designed to adjust the crop residue parameter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for automatically estimating and adjusting crop residue parameters as a tillage implement is being toward across a field by a work vehicle to perform a tillage operation within the field. Specifically, in several embodiments, one or more imaging devices (e.g., a camera(s)) may be provided in operative association with the work vehicle and/or the implement to capture images of the field as the tillage operation is being performed. For example, in one embodiment, the imaging device(s) may be utilized to capture before and after images of various portions of the field prior to and following such portions of the field being tilled. The images may then be automatically analyzed via an associated controller using computer-vision techniques to estimate the percent crop residue coverage for each imaged portion of the field (i.e., the portion of the imaged area within each image that is covered by crop residue divided by the total imaged area). Thereafter, if it is determined that the estimated percent crop residue coverage differs from a given target value or falls outside a given target range, the controller may be configured to automatically adjust the operation of the tillage implement in a manner that increases or decreases, as desired, the amount of crop residue remaining within the field following the tillage operation. For example, the controller may be configured to automatically adjust the ground speed of the tillage implement and/or adjust a tillage parameter(s) associated with one or more ground-engaging tools of the tillage implement (e.g., a penetration depth and/or a down pressure for one or more of the ground-engaging tools).

In several embodiments, the imaging device(s) may be configured to capture side view images of the field from its installed location on the work vehicle or the implement. For instance, the imaging device(s) may be installed on the work vehicle or the implement such that the imaging device(s) has a field of view directed towards the portion(s) of the field passing along one or both sides of the work vehicle/implement as the tillage operation is being performed (e.g., in a direction generally perpendicular to the direction of travel of the work vehicle). As such, when the work vehicle makes a tillage pass across a given section of the field, the imaging device(s) may be configured to capture images of the adjacent portions of the field disposed along one or both sides of the current section of the field being tilled. By configuring the imaging device(s) to capture side view images of the field (e.g., as opposed to forward and aft images generally aligned with the direction of travel of the work vehicle), the adjacent portions of the field may be imaged with a significant reduction in the amount of dust and other airborne particles captured within each image. Specifically, the amount of dust and other airborne particles contained within the air along either side of the work vehicle or tillage implement is typically significantly less than the amount of such airborne particles contained within the air between the work vehicle and the tillage implement and the air directly behind the implement. As a result, the images captured by the imaging device(s) may be more effectively, efficiently, and accurately analyzed by the controller using known computer-vision techniques.

Figure 1:
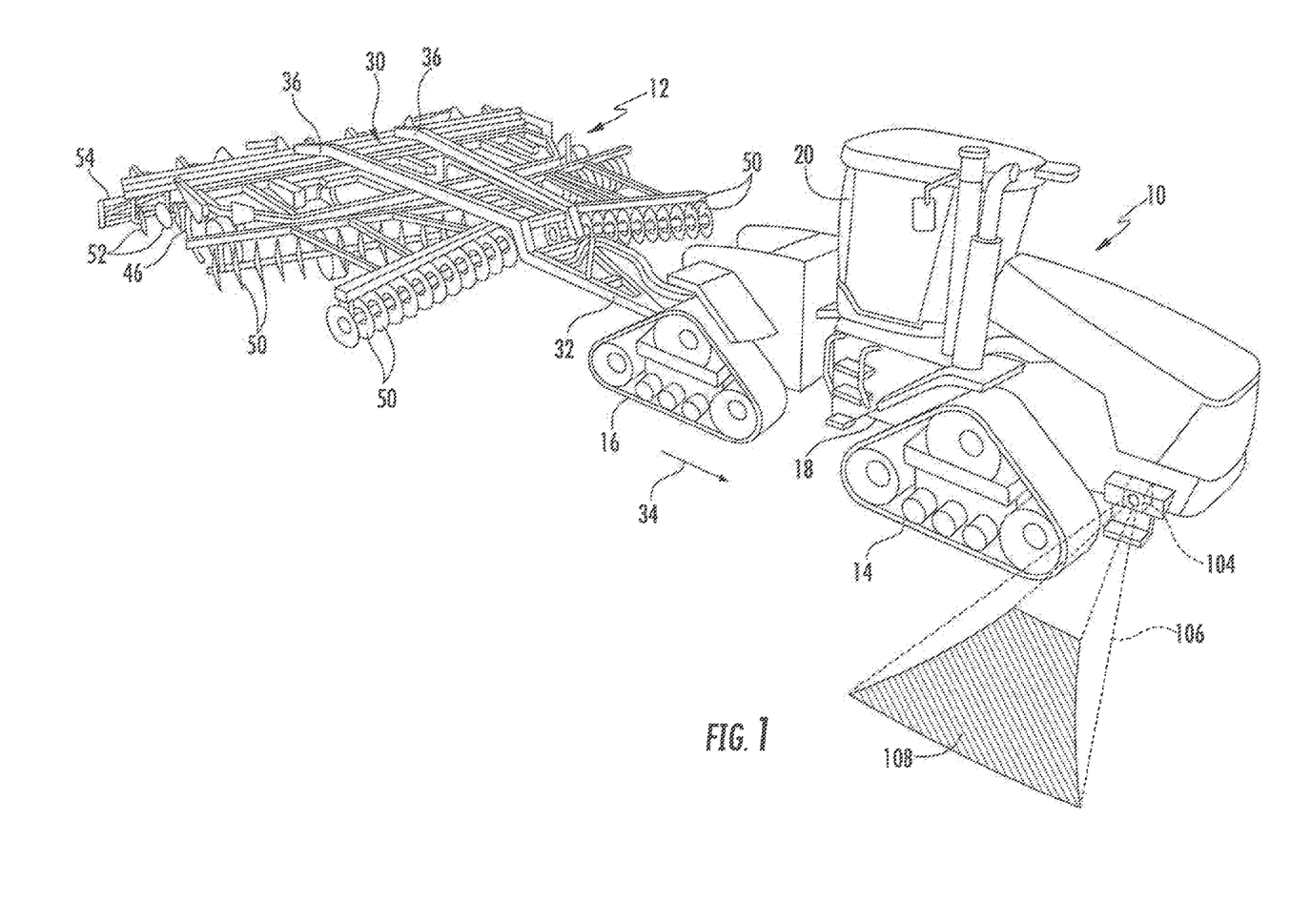
FIG. 1 illustrates a perspective view of one embodiment of a work vehicle towing a tillage implement in accordance with aspects of the present subject matter.
Figure 2:
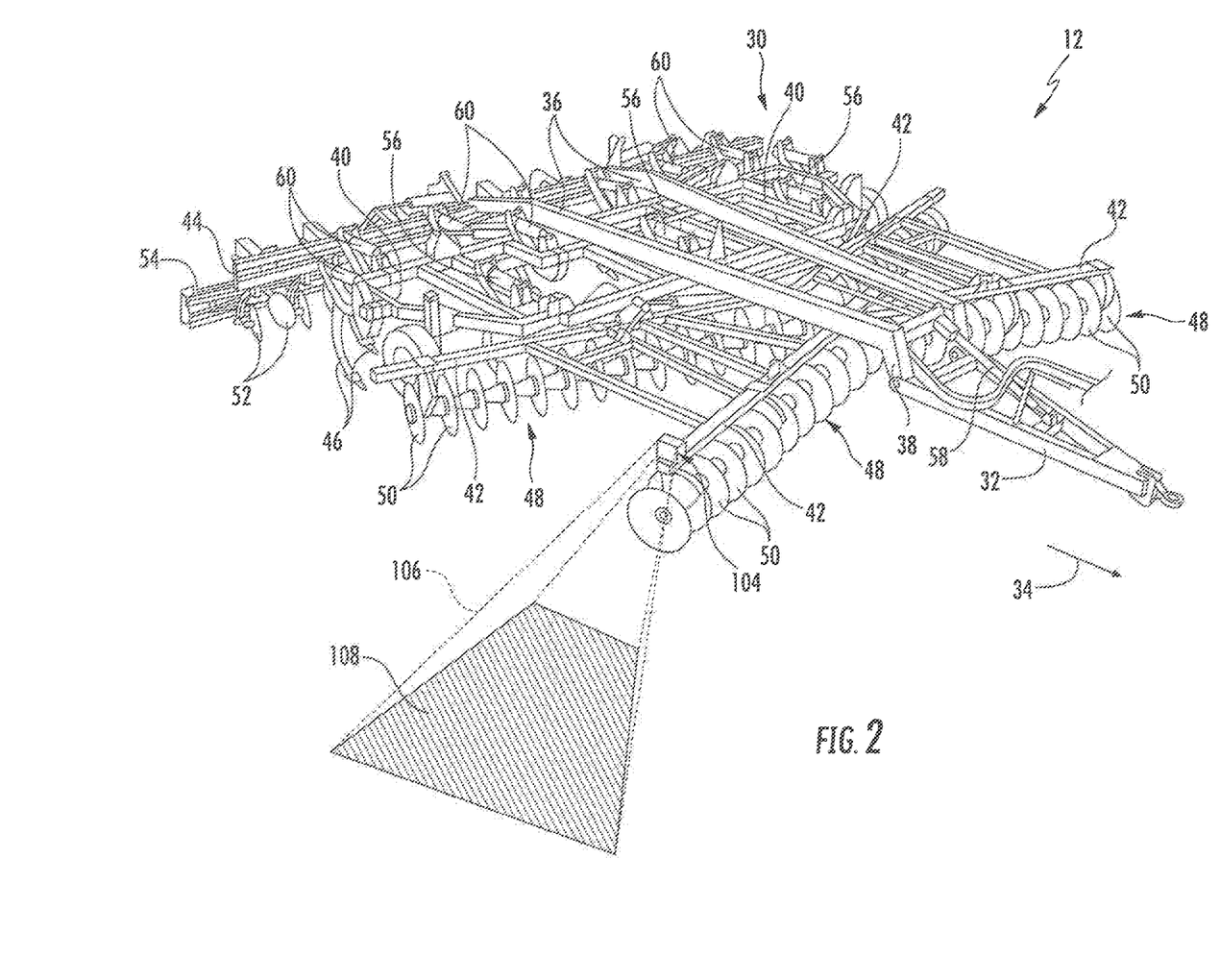
FIG. 2 illustrates a perspective view of the tillage implement shown in FIG. 1.

Referring now to drawings, FIGS. 1 and 2 illustrate perspective views of one embodiment of a work vehicle 10 and an associated agricultural tillage implement 12 in accordance with aspects of the present subject matter. Specifically, FIG. 1 illustrates a perspective view of the work vehicle 10 towing the tillage implement 12 (e.g., across a field). Additionally, FIG. 2 illustrates a perspective view of the tillage implement 12 shown in FIG. 1. As shown in the illustrated embodiment, the work vehicle 10 is configured as an agricultural tractor. However, in other embodiments, the work vehicle 10 may be configured as any other suitable agricultural vehicle.

As particularly shown in FIG. 1, the work vehicle 10 includes a pair of front track assemblies 14, a pair or rear track assemblies 16 and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, as is generally understood, the work vehicle 10 may include an engine 22 (FIG. 3) and a transmission 24 (FIG. 3) mounted on the chassis 18. The transmission 24 may be operably coupled to the engine 22 and may provide variably adjusted gear ratios for transferring engine power to the track assemblies 124, 16 via a drive axle assembly (not shown) (or via axles if multiple drive axles are employed).

Additionally, as shown in FIGS. 1 and 2, the tillage implement 12 may generally include a carriage frame assembly 30 configured to be towed by the work vehicle via a pull hitch or tow bar 32 in a travel direction of the vehicle (e.g., as indicated by arrow 34). As is generally understood, the carriage frame assembly 30 may be configured to support a plurality of ground-engaging tools, such as a plurality of shanks, disk blades, leveling blades, basket assemblies, and/or the like. In several embodiments, the various ground-engaging tools may be configured to perform a tillage operation across the field along which the tillage implement 12.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally function to support a central frame 40, a forward frame 42 positioned forward of the central frame 40 in the direction of travel 34 of the work vehicle 10, and an aft frame 44 positioned aft of the central frame 40 in the direction of travel 34 of the work vehicle 10. As shown in FIG. 2, in one embodiment, the central frame 40 may correspond to a shank frame configured to support a plurality of ground-engaging shanks 46. In such an embodiment, the shanks 46 may be configured to till the soil as the tillage implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10 to promote more effective tilling of the soil. However, in other embodiments, the forward frame 42 may be configured to support any other suitable ground-engaging tools.

Moreover, similar to the central and forward frames 40, 42, the aft frame 44 may also be configured to support a plurality of ground-engaging tools. For instance, in the illustrated embodiment, the aft frame is configured to support a plurality of leveling blades 52 and rolling (or crumbler) basket assemblies 54. However, in other embodiments, any other suitable ground-engaging tools may be coupled to and supported by the aft frame 44, such as a plurality closing disks.

In addition, the tillage implement 12 may also include any number of suitable actuators (e.g., hydraulic cylinders) for adjusting the relative positioning, penetration depth, and/or down force associated with the various ground-engaging tools 46, 50, 52, 54. For instance, the tillage implement 12 may include one or more first actuators 56 coupled to the central frame 40 for raising or lowering the central frame 40 relative to the ground, thereby allowing the penetration depth and/or the down pressure of the shanks 46 to be adjusted. Similarly, the tillage implement 12 may include one or more second actuators 58 coupled to the disk forward frame 42 to adjust the penetration depth and/or the down pressure of the disk blades 50. Moreover, the tillage implement 12 may include one or more third actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the down pressure and/or the penetration depth).

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10, or rely on tires/wheels in lieu of the track assemblies 14, 16.

It should also be appreciated that the configuration of the tillage implement 12 described above and shown in FIGS. 1 and 2 is only provided for exemplary purposes. Thus, it should be appreciated that the present subject matter may be readily adaptable to any manner of tillage implement configuration. For example, as indicated above, each frame section of the tillage implement 12 may be configured to support any suitable type of ground-engaging tools, such as by installing closing disks on the aft frame 44 of the tillage implement 12.

Additionally, in accordance with aspects of the present subject matter, the work vehicle 10 and/or the implement 12 may include one or more imaging devices coupled thereto and/or supported thereon for capturing images of the field as a tillage operation is being performed via the tillage implement 12. Specifically, in several embodiments, the imaging device(s) may be provided in operative association with the work vehicle 10 and/or the implement 12 such that the imaging device(s) has a field of view directed towards a portion(s) of the field disposed along one or both of the sides of the work vehicle 10 and/or the implement 12 as the tillage implement 12 is being towed across the field. As such, the imaging device(s) may capture side view images from the tractor 10 and/or implement 12 of the portion(s) of the field being passed by the tractor 10 and/or implement 12 as an adjacent portion or section of the field is being tilled.

In general, the imaging device(s) may correspond to any suitable device(s) configured to capture images of the field being tilled that allow the field's soil to be distinguished from the crop residue remaining on top of the soil. For instance, in several embodiments, the imaging device(s) may correspond to any suitable camera(s), such as single-spectrum camera or a multi-spectrum camera configured to capture images in the visible light range and/or infrared spectral range. Additionally, in a particular embodiment, the camera(s) may correspond to a single lens camera configured to capture two-dimensional images or a stereo camera(s) having two or more lenses with a separate image sensor for each lens to allow the camera(s) to capture stereographic or three-dimensional images. Alternatively, the imaging device(s) may correspond to any other suitable image capture device(s) and/or vision system(s) that is capable of capturing "images" that allow the crop residue contained within each image to be distinguished from the soil.

As shown in FIG. 1, in one embodiment, an imaging device 104 may be coupled to one of the sides of the work vehicle 10 such that the imaging device 104 has a field of view 106 that allows it to capture images of an adjacent area or portion 108 of the field disposed along the side of the work vehicle 10. For instance, the field of view 106 of the imaging device 104 may be directed along a plane or reference line that extends generally perpendicular to the travel direction 34 of the work vehicle 10. In such an embodiment, as the work vehicle 10 tows the tillage implement 12 to allow a tillage operation to be performed along a given section of the field, the imaging device 104 may capture images along the side of the work vehicle 10 of the adjacent area or portion 108 of the field both before and after such portion 108 of the field has been tilled. As will be described below, by analyzing the images captured by the imaging device 104, an associated controller 102 (FIG. 3) may be configured to estimate a crop residue parameter associated with the imaged portion(s) of the field (e.g., a percent crop residue coverage). Based on the estimated crop residue parameter, the controller 102 may then control/adjust the operation of the tillage implement 12, as necessary, to maintain the crop residue parameter at a given target value and/or within a given target range (e.g., an operating ranged defined around a target crop residue percentage set for the field).

It should be appreciated that, in alternative embodiments, the imaging device(s) may be installed at any other suitable location that allows the imaging device(s) to capture side view images of an adjacent portion of the field disposed along either side of the section of the field currently being tilled. For example, as an alternative embodiment, the imaging device(s) may be coupled to the opposed side of the work vehicle 10 or to the front of the work vehicle 10 in a manner that allows the imaging device(s) to have a field of view directed outwardly from a given side of the work vehicle 10. Similarly, in another embodiment, one or more imaging devices may be coupled to a portion of the tillage implement 12. For instance, as shown in FIG. 2, an imaging device 104 may be coupled to one side of the carriage frame assembly 30 (e.g., to a frame member of the forward frame 40) such that the imaging device 104 has a field of view 106 that allows it to capture images of an adjacent area or portion 108 of the field disposed along the side of the tillage implement 12.

It should also be appreciated that, although the embodiments shown in FIGS. 1 and 2 simply illustrate a single imaging device 104 installed into the work vehicle 10 and/or the tillage implement 12, multiple imaging devices may be installed relative to the work vehicle 10 and/or the implement 12 to allow the imaging devices to capture side view images of the adjacent portion(s) of the field at two or more different perspectives and/or to allow the imaging devices to simultaneously capture side view images of various different portions of the field. For instance, as will be described below with reference to FIGS. 4-6, a separate imaging device 104A, 104B may be coupled to the either side of the work vehicle 10 to allow side view images to be captured of adjacent portions of the field along both sides of the section of the field currently being tilled.

Figure 3:
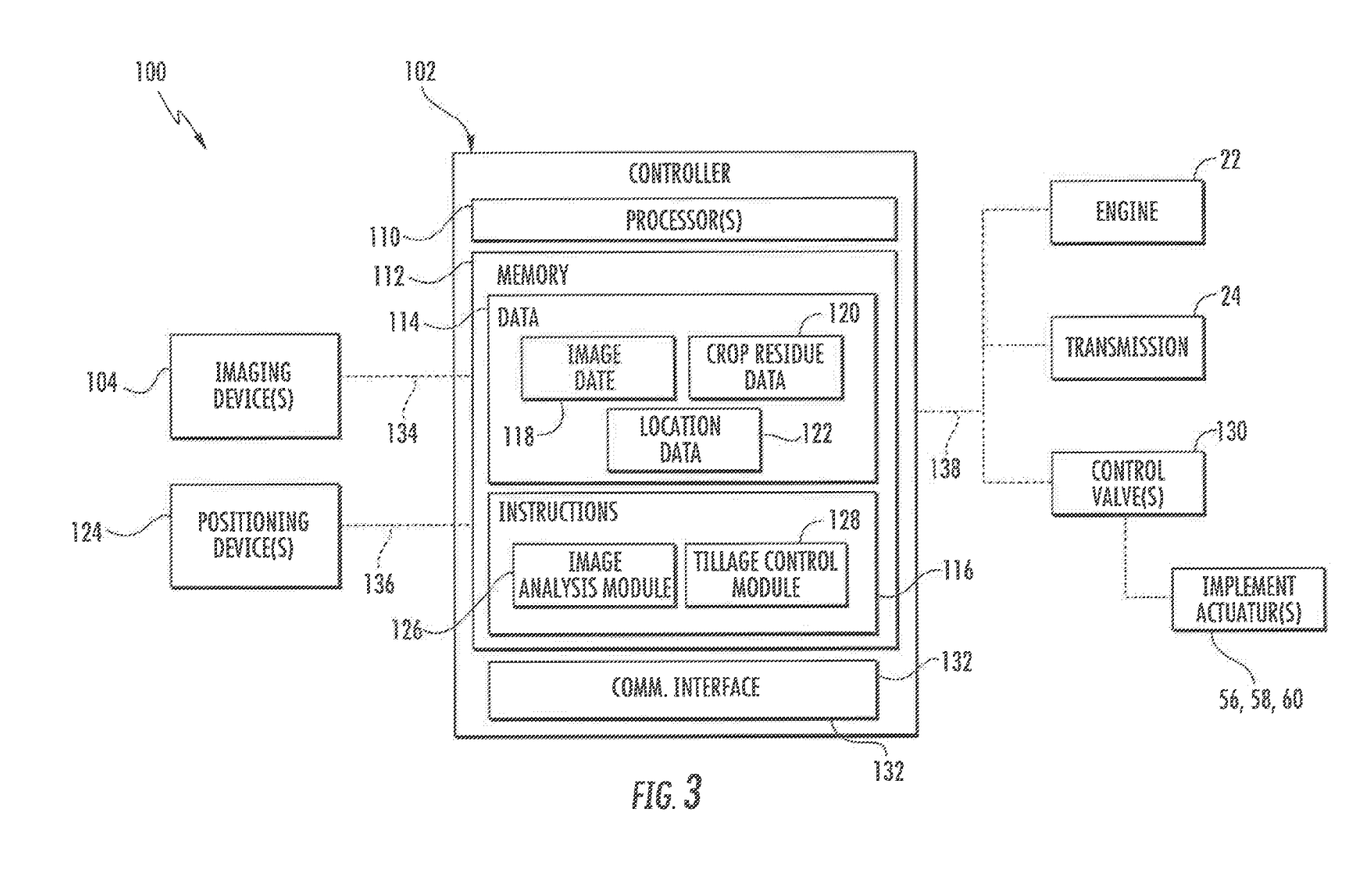
FIG. 3 illustrates a schematic view of one embodiment of a system for estimating and adjusting crop residue parameters as a tillage operation is being performed in accordance with aspects of the present subject matter.

Referring now to FIG. 3, a schematic view of one embodiment of a system 100 for estimating and adjusting crop residue parameters as a tillage operation is being performed is illustrated in accordance with aspects of the present subject matter. In general, the system 100 will be described herein with reference to the work vehicle 10 and the tillage implement 12 described above with reference to FIGS. 1 and 2. However, it should be appreciated that the disclosed system 100 may generally be utilized with work vehicles having any suitable vehicle configuration and/or tillage implements have any suitable implement configuration.

In several embodiments, the system 100 may include a controller 102 and various other components configured to be communicatively coupled to and/or controlled by the controller 102, such as one or more imaging devices 104 and/or various components of the work vehicle 10 and/or the tillage implement 12. As will be described in greater detail below, the controller 102 may be configured to receive side view images from the imaging device(s) 104 that depict portions of the field adjacent to one both sides of the work vehicle 10 and/or the tillage implement 12 as a tillage operation is being performed within the field. Based on an analysis of the images received from the imaging device(s) 104, the controller 102 may be configured to estimate a crop residue parameter associated with the field being tilled. Thereafter, the controller 102 may be configured to adjust the operation of the tillage implement, as necessary, to ensure that the estimated crop residue parameter is maintained at a given target value and/or within a target range.

In general, the controller 102 may correspond to any suitable processor-based device(s), such as a computing device or any combination of computing devices. Thus, as shown in FIG. 3, the controller 102 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

In several embodiments, the data 114 may be stored in one or more databases. For example, the memory 112 may include an image database 118 for storing images received from the imaging device(s) 104. For example, the imaging device(s) 104 may be configured to continuously or periodically capture side view images of adjacent portion(s) of the field as the tillage operation is being performed. In such an embodiment, the images transmitted to the controller 102 from the imaging device(s) 104 may be stored within the image database 118 for subsequent processing and/or analysis.

Additionally, as shown in FIG. 3, the memory 12 may include a crop residue database 120 for storing information related to crop residue parameters for the field being tilled. For example, as will be described below, based on the images received from the imaging device(s) 104, the controller 102 may be configured to estimate or calculate one or more crop residue parameters for the field, such as a percent crop residue coverage for an imaged portion of the field (and/or an average percent crop residue coverage for the field) and/or a percent crop residue differential corresponding to the difference in the pre-tilled and post-tilled percent crop residue coverages for an imaged portion of the field (and/or an average percent crop residue differential). The crop residue parameter(s) estimated or calculated by the controller 102 may then be stored within the crop residue database 120 for subsequent processing and/or analysis.

Moreover, in several embodiments, the memory 12 may also include a location database 112 storing location information about the work vehicle/implement 10, 12 and/or information about the field being tilled (e.g., a field map). Specifically, as shown in FIG. 3, the controller 102 may be communicatively coupled to a positioning device(s) 124 installed on or within the work vehicle 10 and/or on or within the implement 12. For example, in one embodiment, the positioning device(s) 124 may be configured to determine the exact location of the work vehicle 10 and/or the implement 12 by using a satellite navigation position system (e.g. a GPS system, a Galileo positioning system, the Global Navigation satellite system (GLONASS), the BeiDou Satellite Navigation and Positioning system, and/or the like). In such an embodiment, the location determined by the positioning device(s) 124 may be transmitted to the controller 102 (e.g., in the form coordinates) and subsequently stored within the location database 122 for subsequent processing and/or analysis.

Additionally, in several embodiments, the location data stored within the location database 122 may also be correlated to the image data stored within the image database 118. For instance, in one embodiment, the location coordinates derived from the positioning device(s) 124 and the image(s) captured by the imaging device(s) 104 may both be time-stamped. In such an embodiment, the time-stamped data may allow each image captured by the imaging device(s) 102 to be matched or correlated to a corresponding set of location coordinates received from the positioning device(s) 124, thereby allowing the precise location of the portion of the field depicted within a given image to be known (or at least capable of calculation) by the controller 102.

Moreover, by matching each image to a corresponding set of location coordinates, the controller 102 may also be configured to generate or update a corresponding field map associated with the field being tilled. For example, in instances in which the controller 102 already includes a field map stored within its memory 112 that includes location coordinates associated with various points across the field, each image captured by the imaging device(s) 104 may be mapped or correlated to a given location within the field map. Alternatively, based on the location data and the associated image data, the controller 102 may be configured to generate a field map for the field currently being tilled that includes the geo-located images associated therewith.

Referring still to FIG. 3, in several embodiments, the instructions 116 stored within the memory 112 of the controller 102 may be executed by the processor(s) 110 to implement an image analysis module 126. In general, the image analysis module 126 may be configured to analyze the images received by the imaging device(s) 104 to allow the controller 102 to estimate one or more crop residue parameters associated with the field currently being tilled. For instance, the image analysis module 126 may be configured to implement a suitable computer-vision algorithm or any other suitable image-processing technique that allows the controller 102 to identify or distinguish within each image the soil from any crop residue remaining on top of the soil. By distinguishing the soil from the crop residue contained within each image, the controller 102 may then determine the percent crop residue coverage for the imaged portion of the field. Such value may then be stored within the crop residue database 120 and/or utilized to calculate one or more additional crop residue parameters (e.g., an average percent crop residue coverage for the field, a percent crop residue differential for the imaged portion of the field, and/or an average percent crop residue differential for the field). For instance, as will be described below with reference to FIGS. 4-6, the imaging device(s) 1-4 may be used to capture images of the same area or portion of the field before and after such portion of the field has been tilled. Thus, for a given imaged portion of the field, the controller 102 may be configured to calculate value for both a pre-tilled percent crop residue coverage and a post-tilled percent crop residue coverage. The estimated pre-tilled and post-tilled values may then be compared to calculate a percent crop residue differential for the imaged portion of the field, which may provide the controller 102 with an indication of the current effectiveness of the tillage implement 12 in removing crop residue from and/or maintaining crop residue on the surface of the soil.

It should be appreciated that, in general, the computer-vision algorithm and/or image-processing technique utilized by the controller 102 may rely upon any suitable image characteristics captured by the imaging device(s) 104 to identify or distinguish the soil from the crop residue contained within each image. For instance, when the imaging device(s) 104 corresponds to a camera capable of capturing the distinction between the reflective characteristics of the soil and the crop residue, the controller 102 may be configured to implement a computer-vision algorithm that identifies the differences in the reflectivity or spectral absorption between the soil and the crop residue contained within each image being analyzed. Alternatively, the controller 102 may be configured to utilize an edge-finding algorithm to identify or distinguish the soil from the crop residue contained within each image.

Additionally, upon distinguishing the soil from the crop residue, the controller 102 may be configured to utilize any suitable technique or methodology for calculating the percent crop residue coverage for the portion of the field contained within each image. For instance, in one embodiment, the controller 102 may utilize a "blob analysis" in which the crop residue identified within each image is represented as a "blob" or plurality of "blobs" encompassing a given area within the image. In such an embodiment, the percent crop residue coverage for the imaged portion of the field may be calculated using the following equation (Equation 1):

$$\text{Percent Crop Residue} = \left(1 - \frac{(\text{total image area} - \text{blob area})}{\text{total image area}}\right) * 100 \quad (1)$$

wherein, the total image area corresponds to the total area defined within the image (e.g., as a function of the total number of pixels of the image) and the blob area corresponds to the total area represented by crop residue within the image (e.g., as a function of the total number of pixels representing the identified crop residue).

Moreover, as shown in FIG. 3, the instructions 116 stored within the memory 112 of the controller 102 may also be executed by the processor(s) 110 to implement a tillage control module 128. In general, the tillage control module 128 may be configured to adjust the operation of the tillage implement 12 by controlling one or more components of the tillage implement 12 and/or the work vehicle 10. Specifically, in several embodiments, when the estimated crop residue parameter differs from a given target set for such parameter, the tillage control module 128 may be configured to fine-tune the operation of the tillage implement 12 in a manner designed to adjust the amount of crop residue remaining in the field. For instance, when it is desired to have a percent crop residue coverage of 30%, the tillage control module 128 may be configured to adjust the operation of the tillage implement 12 so as to increase or decrease the amount of crop residue remaining in the field when the estimated percent crop residue coverage for a given imaged portion of the field (or an average estimated percent crop residue coverage across multiple imaged portions of the field) differs from the target percentage. Similarly, when it is desired to have a percent crop residue coverage of greater than 20% and less than 30%, the tillage control module 128 may be configured to adjust the operation of the tillage implement 12 so as to increase or decrease the amount of crop residue remaining in the field when the estimated percent crop residue coverage for a given imaged portion of the field (or an average estimated percent crop residue coverage across multiple imaged portions of the field) falls outside the target range.

It should be appreciated that the controller 102 may be configured to implement various different control actions to adjust the operation of the tillage implement 12 in a manner that increases or decreases the amount of crop residue remaining in the field. In one embodiment, the controller 102 may be configured to increase or decrease the operational or ground speed of the implement 12 to affect an increase or decrease in the crop residue coverage. For instance, as shown in FIG. 3, the controller 102 may be communicatively coupled to both the engine 22 and the transmission 24 of the work vehicle 10. In such an embodiment, the controller 102 may be configured to adjust the operation of the engine 22 and/or the transmission 24 in a manner that increases or decreases the ground speed of the wok vehicle 10 and, thus, the ground speed of the tillage implement 12, such as by transmitting suitable control signals for controlling an engine or speed governor (not shown) associated with the engine 22 and/or transmitting suitable control signals for controlling the engagement/disengagement of one or more clutches (not shown) provided in operative association with the transmission 24.

In addition to the adjusting the ground speed of the tillage implement 12 (or as an alternative thereto), the controller 102 may also be configured to adjust a tillage parameter associated with the ground-engaging tools of the tillage implement 12. For instance, as shown in FIG. 3, the controller 102 may be communicatively coupled to one or more valves 130 configured to regulate the supply of fluid (e.g., hydraulic fluid or air) to one or more corresponding actuators 56, 58, 60 of the tillage implement 12. In such an embodiment, by regulating the supply of fluid to the actuator(s) 56, 58, 60, the controller 104 may automatically adjust the penetration depth, the down force, and/or any other suitable tillage parameter associated with the ground-engaging tools of the tillage implement 12.

Referring still to FIG. 3, the controller 102 may also include a communications interface 132 to provide a means for the controller 102 to communicate with any of the various other system components described herein. For instance, one or more communicative links or interfaces 134 (e.g., one or more data buses) may be provided between the communications interface 132 and the imaging device(s) 104 to allow images transmitted from the imaging device(s) 104 to be received by the controller 102. Similarly, one or more communicative links or interfaces 136 (e.g., one or more data buses) may be provided between the communications interface 132 and the positioning device(s) 124 to allow the location information generated by the positioning device(s) 124 to be received by the controller 102. Moreover, as shown in FIG. 3, one or more communicative links or interfaces 138 (e.g., one or more data buses) may be provided between the communications interface 132 and the engine 22, the transmission 24, the control valves 130, and/or the like to allow the controller 102 to control the operation of such system components.

Figure 4:
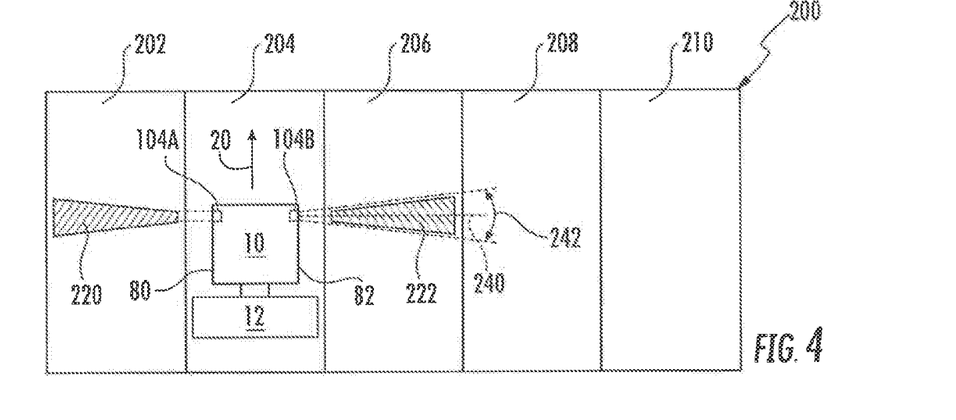
FIG. 4 illustrates a simplified, aerial view of a work vehicle and associated tillage implement performing a tillage operation within a field in accordance with aspects of the present subject matter, particularly illustrating side view images of the field being captured during the tillage operation.
Figure 5:
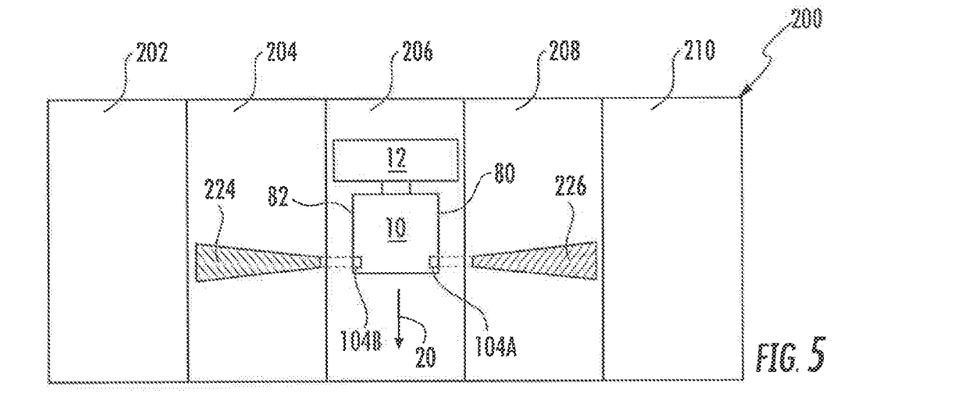
FIG. 5 illustrates another simplified, aerial view of the work vehicle and the tillage implement shown in FIG. 4, particularly illustrating the work vehicle making another tillage pass across the field as side view images of the field are being captured.
Figure 6:
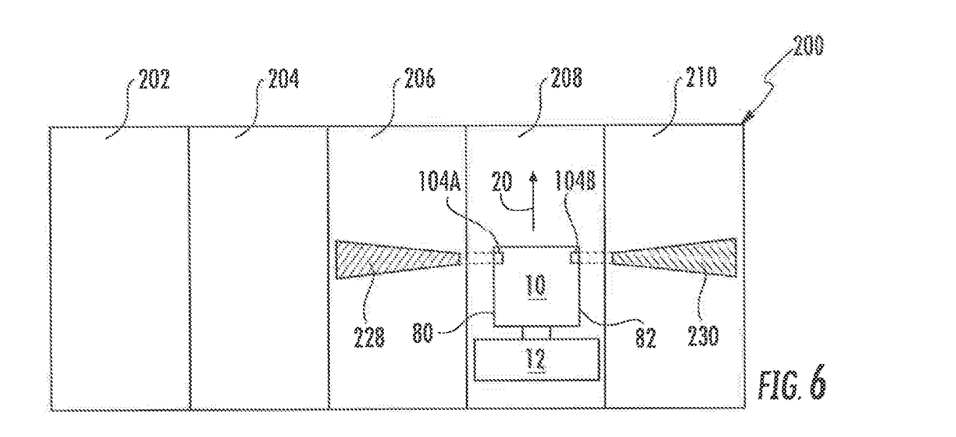
FIG. 6 illustrates yet another simplified, aerial view of the work vehicle and the tillage implement shown in FIG. 4, particularly illustrating the work vehicle making a further tillage pass across the field as side view images of the field are being captured.

Referring now to FIGS. 4-6, simplified, aerial views of a work vehicle 10 and associated tillage implement 12 performing a tillage operation within a field 200 is illustrated in accordance with aspects of the present subject matter. As shown, the field 200 may be divided into a plurality of different field sections generally defining the various different passes to be made by the work vehicle 10 and the tillage implement 12 across the field 200 when performing the tillage operation. For example, in the portion of the field 200 shown in FIGS. 4-6, five different field sections (e.g., a first field section 202, a second field section 204, a third field section 206, a fourth field section 208, and a fifth field section 210) are illustrated that correspond to five separate passes to be made by the work vehicle 10 and the tillage implement 12 across the field 200.

As shown in the illustrated embodiment, the work vehicle 10 includes a first imaging device 104A having a field of view directed towards the portion of the field 200 disposed on a first side 80 of the work vehicle 10 and a second imaging device 104B having a field of view directed towards the portion of the field 200 disposed on a second side 82 of the work vehicle 10. As such, the imaging devices 104A, 104B may be configured to capture side view images of the portions of the field 200 disposed along the opposed sides 80, 82 of the work vehicle 10 as the work vehicle 10 tows the tillage implement 12 across the field 200 to make the various tillage passes while performing the tillage operation. For instance, as shown in FIG. 4, as the work vehicle 10 traverses across the second field section 204 to allow such section 204 to be tilled via the tillage implement 12, the first imaging device 104A may be configured to capture a plurality of images of various portions or imaged areas of the first field section 202 (e.g., imaged area 220) while the second imaging device 104B may be configured to capture a plurality of images of various portions or imaged areas of the third field section 206 (e.g., imaged area 222). Following the tillage pass across the second field section 204, the work vehicle 10 may be turned around to make a subsequent pass across the adjacent, third field section 206 to allow such section to be tilled via the tillage implement 12. As shown in FIG. 5, as the work vehicle 10 traverses across the third field section 206, the first imaging device 104A may be configured to capture a plurality of images of various portions or imaged areas of the second field section 204 (e.g., imaged area 224) while the second imaging device 104B may be configured to capture a plurality of images of various portions or imaged areas of the fourth field section 208 (e.g., imaged area 226). Such process may then be repeated as the work vehicle 10 makes subsequent tillage passes across the field 200. For example, as shown in FIG. 6, as the work vehicle 10 traverses across the fourth field section 208 to allow such section 208 to be tilled via the tillage implement 12, the first imaging device 104A may be configured to capture a plurality of images of various portions or imaged areas of the third field section 206 (e.g., imaged area 228) while the second imaging device 104B may be configured to capture a plurality of images of various portions or imaged areas of the fifth field section 210 (e.g., imaged area 230).

It should be appreciated that, by capturing images of portions of the field along either side 80, 82 of the work vehicle 10 as it is traversed across the field 200, the imaging devices 104A, 104B may be configured to capture images of specific portions of the field 200 before and after the tillage operation is performed on such field portions. For instance, as shown in FIG. 4, during the tillage pass across the second field section 204, images of the third field section 206 may be captured (e.g., via the second imaging device 104B) prior to the third field section 206 being tilled. Thereafter, as shown in FIG. 6, during the tillage pass across the fourth field section 208, images of the third field section 206 may be captured (e.g., via the second imaging device 104A) after the section 206 has been tilled. In such an embodiment, the before and after images of each imaged portion of the third field section 206 may be matched (e.g., using the location data provided by the positioning device(s) 124) and subsequently analyzed to determine how the current operating settings for the tillage implement 12 are impacting the crop residue coverage.

For example, using the location coordinates correlated to each image captured by the imaging devices 104A, 104B, the controller 102 may determine that the images depicting the imaged areas 222, 228 shown in FIGS. 4 and 6 correspond to before and after (or pre-tilled and post-tilled) images of the same portion of the third field section 206. In such an embodiment, the controller 102 may be configured to analyze each image to estimate a pre-tilled percent crop residue coverage and a post-tilled percent crop residue coverage for such portion of the field 200. The controller 102 may then compare the estimated percentages to calculate a differential between the pre-tilled percent crop residue coverage and post-tilled percent crop residue coverage. For instance, if the pre-tilled percent crop residue coverage corresponds to 50% and the post-tilled percent crop residue coverage corresponds to 35%, the controller 102 may determine that the tillage implement 12 has reduced the crop residue percentage by 15%. Depending on the target percentage(s) for the field, the controller 102 may then adjust the aggressiveness of the current operating settings for the tillage implement 12, as necessary, to ensure that the target is maintained or achieved. For instance, if the post-tilled percent crop residue coverage is too high or if the percent crop residue differential is too low, the controller 102 may be configured to adjust the operation of the tillage implement 12 in a manner that increases the aggressiveness of its tillage parameters (e.g., by increasing the penetration depth and/or the down force for the ground-engaging tools of the tillage implement 12). Similarly, if the post-tilled percent crop residue coverage is too low or if the percent crop residue differential is too high, the controller 102 may be configured to adjust the operation of the tillage implement 12 in a manner that decreases the aggressiveness of its tillage parameters (e.g., by decreasing the penetration depth and/or the down force for the ground-engaging tools of the tillage implement 12).

It should be appreciated that, although the work vehicle 10 shown in FIGS. 4-6 includes two separate imaging devices 104A, 104B, the above-described methodology for capturing before and after images of various portions of a field 200 may be similarly implemented with a single imaging device. For instance, assuming that the work vehicle 10 only includes the second imaging device 104B shown in FIGS. 4-6, the second imaging device 104B may be configured to capture pre-tilled images of the adjacent portions of the field 200 provided along the second side 82 of the work vehicle 10 as the work vehicle 10 makes tillage passes in the travel direction 20 shown in FIGS. 4 and 6. In such an embodiment, when the work vehicle 10 turns around and makes tillage passes in the travel direction 20 shown in FIG. 5, the second side 82 of the work vehicle 10 will be facing the previously tilled sections of the field 200. As such, the second imaging device 104B may be used to capture post-tilled images of the adjacent portions of the field 200 provided along the second side 82 of the work vehicle 10.

It should also be appreciated that, as indicated above, the field of view of each imaging device 104A, 104B may, in one embodiment, be directed generally perpendicular to the travel direction 20 of the work vehicle 10. As described herein, the field of view of an imaging device may be directed generally perpendicular of the travel direction 20 of the work vehicle if the center of the field of view is directly along a view path having an angle of orientation defined relative to a reference line or plane extending perpendicular to the travel direction 20 that falls within an angular range of from about +/−25 degrees, such as from about +/−20 degrees or from about +/−10 degrees and/or any other subranges therebetween. For instance, as shown in FIG. 4, the second imaging device 104B defines a field of view having an angle of orientation defined relative to a reference line or plane 240 extending perpendicular to the travel direction 20 that falls within a specific angular range 242 (e.g., +/−25 degrees).

Figure 7:
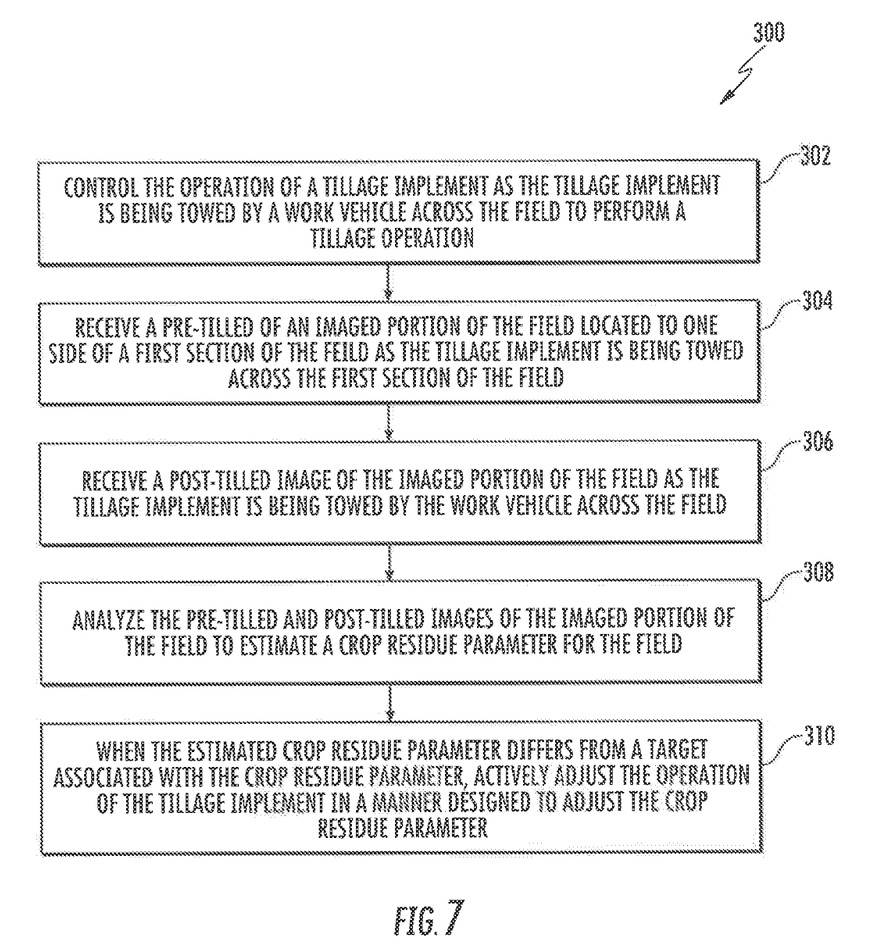
FIG. 7 illustrates a flow diagram of one embodiment of a method for estimating and adjusting crop residue parameters as a tillage operation is being performed in accordance with aspects of the present subject matter.

Referring now to FIG. 7, a flow diagram of one embodiment of a method 300 for estimating and adjusting crop residue parameters as a tillage operation is being performed within a field is illustrated in accordance with aspects of the present subject matter. In general, the method 300 will be described herein with reference to the work vehicle 10 and the tillage implement 12 shown in FIGS. 1 and 2, as well as the various system components shown in FIG. 3. However, it should be appreciated that the disclosed method 300 may be implemented with work vehicles and/or tillage implements having any other suitable configurations and/or within systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method may include controlling the operation of a tillage implement as the tillage implement is being towed by a work vehicle across the field to perform the tillage operation. Specifically, as indicated above, the controller 102 of the disclosed system 100 may be configured to control the operation of the tillage implement 12, such as by controlling the ground speed at which the implement 12 is being towed and/or by controlling one or more tillage parameters associated with the implement (e.g., the down pressure and/or the penetration depth of one or more ground-engaging tools of the implement 12).

Additionally, at (304), the method 300 may include receiving a pre-tilled image of an imaged portion of the field located to one side of a first section of the field as the tillage implement is being towed across the first section of the field. Specifically, as indicated above, the controller 102 may be coupled to one or more imaging devices 104 configured to capture side view images of various portions of the field prior to the tillage operation being performed on such portions of the field.

Moreover, at (306), the method 300 may include receiving a post-tilled image of the imaged portion of the field as the tillage implement is being towed by the work vehicle across the field. Specifically, in addition to capturing a pre-tilled image of a given portion of the field, the imaging device(s) 104 may also be utilized to capture a subsequent side view image of the same portion of the field after the tillage operation has been performed thereon. As indicated above, the pre-tilled and post-tilled images may be matched or correlated to each other, for example, using the location data provided by the positioning device(s) 124.

Referring still to FIG. 7, at (308), the method 300 may include analyzing the pre-tilled and post-tilled images of the imaged portion of the field to estimate a crop residue parameter for the field. For instance, as indicated above, the controller 102 may, in several embodiments, be configured to implement a computer-vision algorithm or any other suitable image-processing technique that allows the controller 102 to distinguish the crop residue contained within each image from the underlying soil. In such embodiments, by identifying the amount of crop residue contained within each image, the controller 102 may be configured to estimate or calculate a percent crop reside cover for each imaged portion of the field.

Additionally, at (310), the method 300 may include actively adjusting the operation of the tillage implement in a manner designed to adjust the crop residue parameter when the estimated crop residue parameter differs from a target associated with the crop residue parameter. Specifically, as indicated above, when the estimated crop residue parameter differs from a target value set for such parameter (or falls outside a target range set for such parameter), the controller 102 may be configured to actively adjust the operation of the tillage implement 12 in a manner that increases or decreases the amount of crop residue remaining within the field following the tillage operation. For instance, the controller 102 may be configured to adjust the ground speed at which the implement 12 is being towed and/or adjust one or more tillage parameters associated with the implement 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for estimating and adjusting crop residue parameters as a tillage operation is being performed within a field, the method comprising:
    capturing, with a first imaging device, a first pre-tilled image of an imaged portion of a second section of the field located to a first side of the first section as the tillage implement is being towed across the first section of the field by a work vehicle;
    capturing, with the first imaging device, a first post-tilled image of the imaged portion of the first section of the field as the tillage implement is being towed by the work vehicle across the second section of the field;
    analyzing, with a computing device, the pre-tilled and post-tilled images of the imaged portion of the field to estimate a crop residue parameter for the field; and
    when the estimated crop residue parameter differs from a target associated with the crop residue parameter, actively adjusting, with the computing device, the operation of the tillage implement in a manner designed to adjust the crop residue parameter.

2. The method of claim 1, wherein the pre-tilled image is associated with an initial side view image of the imaged portion of the field from one of the work vehicle or the tillage implement prior to the tillage operation being performed thereon.

3. The method of claim 1, wherein the post-tilled image is associated with a subsequent side view image of the imaged portion of the field after the tillage operation has been performed thereon.

4. The method of claim 1, wherein the first imaging device has a field of view that extends at least partially laterally outward of the work vehicle.

5. The method of claim 1, wherein the first imaging device has a field of view that extends at least partially laterally outward of the implement.

6. The method of claim 5, wherein analyzing the pre-tilled and post-tilled images further comprises analyzing the pre-tilled and post-tilled images to estimate both a pre-tilled percent crop residue coverage for the imaged portion of the field and a post-tilled percent crop residue coverage for the imaged portion of the field.

7. The method of claim 6, wherein actively adjusting the operation of the tillage implement comprises actively adjusting the operation of the tillage implement to adjust the crop residue parameter when the post-tilled percent crop residue coverage differs from a target percentage associated with the crop residue parameter.

8. The method of claim 6, further comprising:
    determining a percent crop residue differential for the imaged portion of the field based on the pre-tilled percent crop residue coverage and post-tilled percent crop residue coverage,
    wherein actively adjusting the operation of the tillage implement comprises actively adjusting the operation of the tillage implement based on at least one of the percent crop residue differential or the post-tilled percent crop residue coverage.

9. The method of claim 8, wherein automatically identifying the crop residue contained within each of the pre-tilled and post-tilled images comprises identifying the crop residue based on differences in a reflectivity or spectral absorption between the crop residue and soil contained within each of the pre-tilled and post-tilled images.

10. The method of claim 1, wherein actively adjusting the operation of the tillage implement comprises adjusting at least one of a ground speed of the tillage implement or a tillage parameter associated with one or more ground-engaging tools of the tillage implement.

11. The method of claim 1, further comprising:
capturing, with a second imaging device, at least one of a second post-tilled image or a pre-tilled image of the field located to a second side of the work vehicle as the tillage implement is being towed across the first section of the field; and
analyzing, with the computing device, the at least one of a second post-tilled image or a pre-tilled image of the field to estimate a crop residue parameter for the field.

12. A system for estimating and adjusting crop residue parameters as a tillage operation is being performed within a field via a tillage implement towed by a work vehicle, the system comprising:
a first imaging device installed relative to one of the work vehicle or the tillage implement such that the imaging device is configured to capture a pre-tilled image and a post-tilled image of the field as the tillage operation is being performed; and
a controller commutatively coupled to the imaging device, the controller including a processor and associated memory, the memory storing instructions that, when implemented by the processor, configure the controller to:
receive, from the imaging device, a first image of an imaged portion of the field located to laterally outwardly of the implement as the tillage implement is being towed by the work vehicle across the field;
receive, from the imaging device, a second image of the imaged portion of the field as the tillage implement is being towed by the work vehicle along the field;
determine whether the first image is a pre-tilled image or a post-tilled image and whether the first image is a pre-tilled image;
analyze the first and second images of the imaged portion of the field to estimate a crop residue parameter for the field when the first image is a pre-tilled image and the second image is a post-tilled image; and
when the estimated crop residue parameter differs from a target associated with the crop residue parameter, actively adjust the operation of the tillage implement in a manner designed to adjust the crop residue parameter.

13. The system of claim 12, wherein a field of view of the imaging device is angularly offset from a travel direction of the work vehicle.

14. The system of claim 12, wherein the first imaging device is configured to capture images of the field along a first side of the one of the work vehicle or the tillage implement.

15. The system of claim 14, further comprising:
a second imaging device configured to capture images of the field along a second side of the one of the work vehicle or the tillage implement, wherein a field of view of the first imaging device is separate from a field of view of the second imaging device as the work vehicle travels along a section of the field.

16. The system of claim 12, wherein the controller is configured to analyze the pre-tilled and post-tilled images to estimate both a pre-tilled percent crop residue coverage for the imaged portion of the field and a post-tilled percent crop residue coverage for the imaged portion of the field.

17. The system of claim 12, wherein the first imaging device captures the pre-tilled image while the work vehicle travels along a first direction, and the post-tilled image while traveling in a second direction, the second direction generally opposite to the first direction.

18. A system for estimating and adjusting crop residue parameters as a tillage operation is being performed within a field via a tillage implement towed by a work vehicle, the system comprising:
a first imaging device installed relative to one of the work vehicle or the tillage implement such that the imaging device is configured to capture a pre-tilled image and a post-tilled image of the field as the tillage operation is being performed; and
a controller commutatively coupled to the imaging device, the controller including a processor and associated memory, the memory storing instructions that, when implemented by the processor, configure the controller to:
receive, from the imaging device, a first image of an imaged portion of the field located to laterally outwardly of the implement as the tillage implement is being towed by the work vehicle across the field;
receive, from the imaging device, a second image of the imaged portion of the field as the tillage implement is being towed by the work vehicle along the field;
geo-locate the first image and the second image to a common location within the field;
determine whether the first image is a pre-tilled image or a post-tilled image and whether the first image is a pre-tilled image;
analyze the first and second images of the imaged portion of the field to estimate a crop residue parameter for the field when the first image is a pre-tilled image and the second image is a post-tilled image; and
when the estimated crop residue parameter differs from a target associated with the crop residue parameter, actively adjust the operation of the tillage implement in a manner designed to adjust the crop residue parameter.

19. The system of claim 18, wherein controller is further configured to determine a percent crop residue differential for the imaged portion of the field based on a pre-tilled percent crop residue coverage and a post-tilled percent crop residue coverage.

20. The system of claim 18, wherein the controller is further configured to automatically identify crop residue contained within each of the pre-tilled and post-tilled images using a computer-vision technique.

* * * * *